(12) United States Patent
Lokkinen

(10) Patent No.: US 12,151,428 B2
(45) Date of Patent: Nov. 26, 2024

(54) METHOD OF LINING BRANCH AREA IN PIPELINE

(71) Applicant: Picote Solutions Oy Ltd, Porvoo (FI)

(72) Inventor: Mika Lokkinen, Tallinn (EE)

(73) Assignee: Picote Solutions Oy Ltd, Porvoo (FI)

( * ) Notice: Subject to any disclaimer, the term of this patent is extended or adjusted under 35 U.S.C. 154(b) by 116 days.

(21) Appl. No.: 18/162,099

(22) Filed: Jan. 31, 2023

(65) Prior Publication Data

US 2023/0249393 A1 Aug. 10, 2023

(30) Foreign Application Priority Data

Feb. 10, 2022 (EP) ..................................... 22156102

(51) Int. Cl.
*B29C 63/28* (2006.01)
*B29C 63/34* (2006.01)
*F16L 55/165* (2006.01)
*F16L 55/179* (2006.01)

(52) U.S. Cl.
CPC ............ *B29C 63/28* (2013.01); *B29C 63/341* (2013.01); *F16L 55/1654* (2013.01); *F16L 55/179* (2013.01)

(58) Field of Classification Search
CPC .... B29C 63/28; B29C 63/341; F16L 55/1654; F16L 55/179
USPC .......................................................... 156/64
See application file for complete search history.

(56) References Cited

U.S. PATENT DOCUMENTS

| | | | |
|---|---|---|---|
| 5,706,861 A * | 1/1998 | Wood | F16L 55/163 |
| | | | 405/184.2 |
| 9,890,891 B2 * | 2/2018 | Manners | F16L 55/1654 |
| 2003/0015247 A1 | 1/2003 | Driver et al. | |
| 2015/0369399 A1 | 12/2015 | Fyfe | |
| 2018/0354206 A1 | 12/2018 | Rosemont et al. | |
| 2020/0400263 A1 | 12/2020 | Trapani et al. | |

* cited by examiner

*Primary Examiner* — James D Sells
(74) *Attorney, Agent, or Firm* — Renner, Kenner, Greive, Bobak, Taylor & Weber

(57) ABSTRACT

A method of lining a branch area in a pipeline using an inflatable bladder. The method includes steps of preparing a branch liner with resin and positioning the branch liner in a pipeline, inflating the bladder and running a flow of air and steam through the bladder while monitoring its temperature. After curing of the resin, temperature of the liner is monitored and the bladder is removed only after proper cooling of the liner.

9 Claims, 3 Drawing Sheets

METHOD OF LINING BRANCH AREA IN PIPELINE

FIELD OF THE INVENTION

The present invention relates to pipe renovation methods and in particular to a method for lining a branch area in a pipeline with a cured-in-place-pipe (CIPP) method.

BACKGROUND

Pipes, such as water and sewage pipes, approaching the end of their service life may be renovated e.g. by lining or coating the inside of an old pipe or by mounting a new pipe into an old pipe. An epoxy resin-impregnated polyester liner, for example, that is inverted into a pipe to be renovated using compressed air, steam or water can be used in lining. After inversion of the liner into the pipe, excess pressure is maintained inside the liner until the epoxy resin cures to its shape conforming to the walls of the old pipe. Modern technology allows even highly complex pipes to be lined.

One of the problems associated with the lining of pipes are joints of separate liners installed in a pipe system, typically at branches and junctions of the pipe system. A certain amount of overlapping of liners is desirable to prevent a leak between the liners. In branches and junctions this is sometimes difficult to implement by using straight tubular liners. Therefore, separate branch pieces have been used to prepare a branch with one layer of liner before lining the pipes which connect to the branch. The branch piece has essentially the same form as the branch, for example, T-shaped branch piece for a T-branch and Y-shaped branch piece for a Y-branch. Inside the branch piece, a separate inflatable bladder is connected to an air hose which supplies air to the bladder and pushes the branch piece against walls of the pipe system at the branch position by inflating the bladder. When the resin has cured, the bladder is removed. Sometimes the curing process does not progress as estimated and after the bladder is removed, the branch piece collapses and can't be re-positioned nor removed from the pipe. Similar collapse can happen if the curing process has been expedited with heat and the resin has not cooled off properly.

SUMMARY OF THE INVENTION

It is an object of the present invention to present a method that alleviates the problems associated with the prior art solutions. With a disclosed method, the heating of the resin can be done in controlled conditions by adjusting the heating based on actual temperature. After curing, the cooling is also monitored, which allows for safe removal of the bladder as soon as possible.

BRIEF DESCRIPTION OF THE DRAWINGS

In the following, the present invention is described in greater detail by means of preferred embodiments with reference to the accompanying drawings, in which.

DETAILED DESCRIPTION OF THE INVENTION

Renovation of pipelines in buildings, such as residential buildings, offices and industrial plants, by using the CIPP (Cured In-Place Pipe) pipe lining method has become common in recent years. The CIPP industry has evolved from leak repairs where a short piece of liner was installed to repair a leaking part of an existing pipe to lining of main lines only to full renovations where every pipe and connection is lined creating a complete new pipeline inside the existing old pipeline. A full renovation requires lining of pipes in various sizes, usually through multiple bends and including many connections. In many cases, branches, such as T-branches or Y-branches of a pipeline, have to be lined with a branch piece prior to lining the pipes which connect at the branch. An installation device is needed to move the branch piece into the branch area, position the branch piece accordingly, and open up the branch piece so that it is positioned against inner walls of the pipes in the branch area. The installation device can be removed from the pipeline once the epoxy resin of the branch piece has cured. After that, the pipes can be lined with liners running through the branch piece or ending within the branch piece with a proper overlap which prevents leaking.

Figure 1:
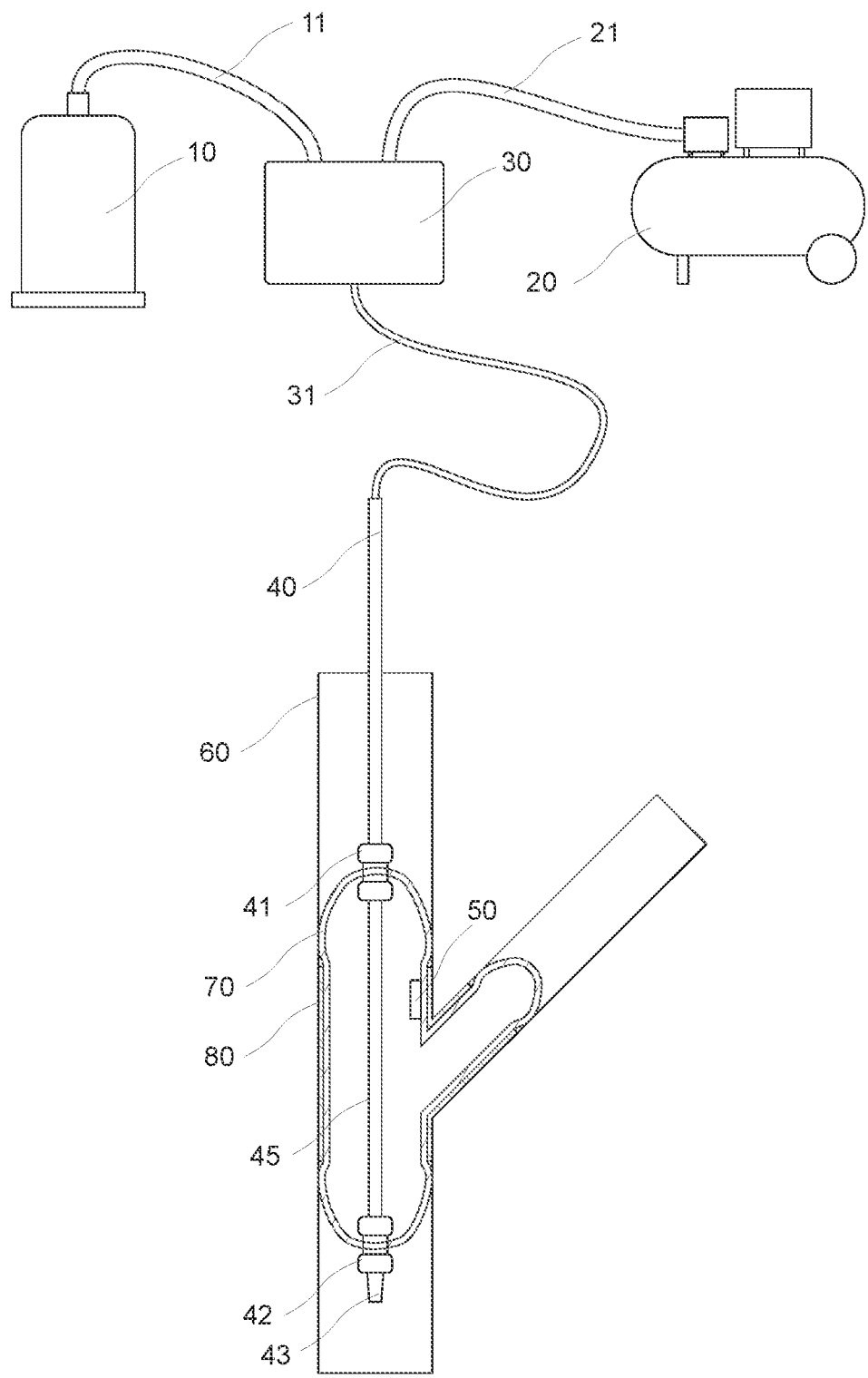
FIG. 1 shows an overview of an example of a lining system.
Figure 2:
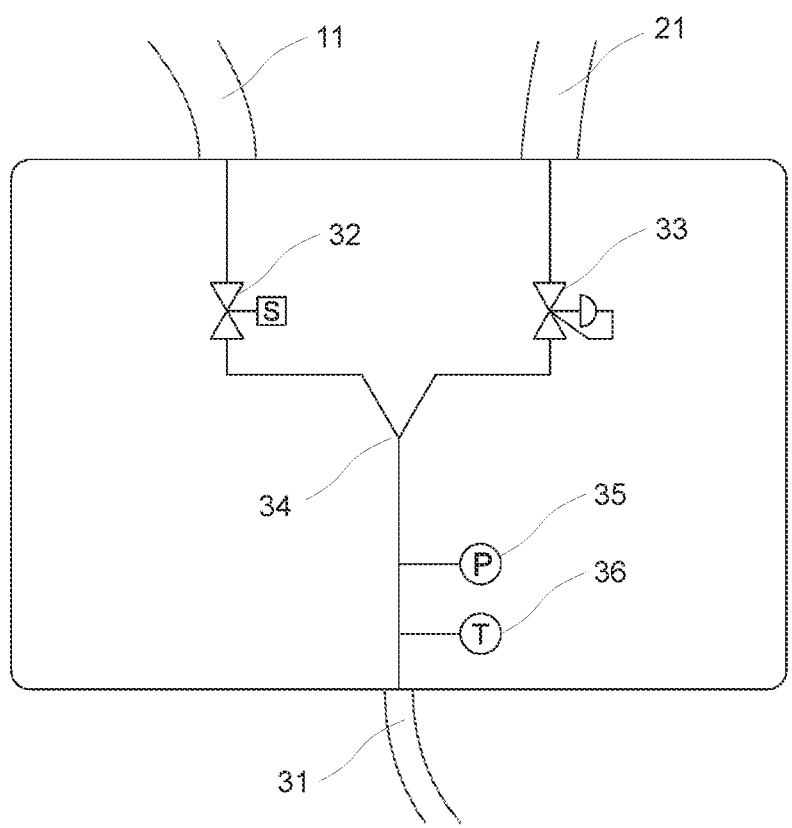
FIG. 2 shows details of an example of a control unit.

FIG. 1 illustrates an exemplary system for lining a branch area of a pipeline. FIG. 2 illustrates internal components and connections of an embodiment of a control unit 30. The system can be used for installing a branch piece, made of typical liner material and impregnated with epoxy resin, to a branch area of a pipe system. Other suitable impregnation resins may also be used. The branch area can, for example, be a T-branch wherein two pipes connect in a 90-degree angle or a Y-branch, as illustrated in FIG. 1, wherein two pipes connect in e.g. a 30 to 60 degree angle. The system of the illustrated embodiment can be used to implement embodiments of method of the present disclosure.

Figure 3:
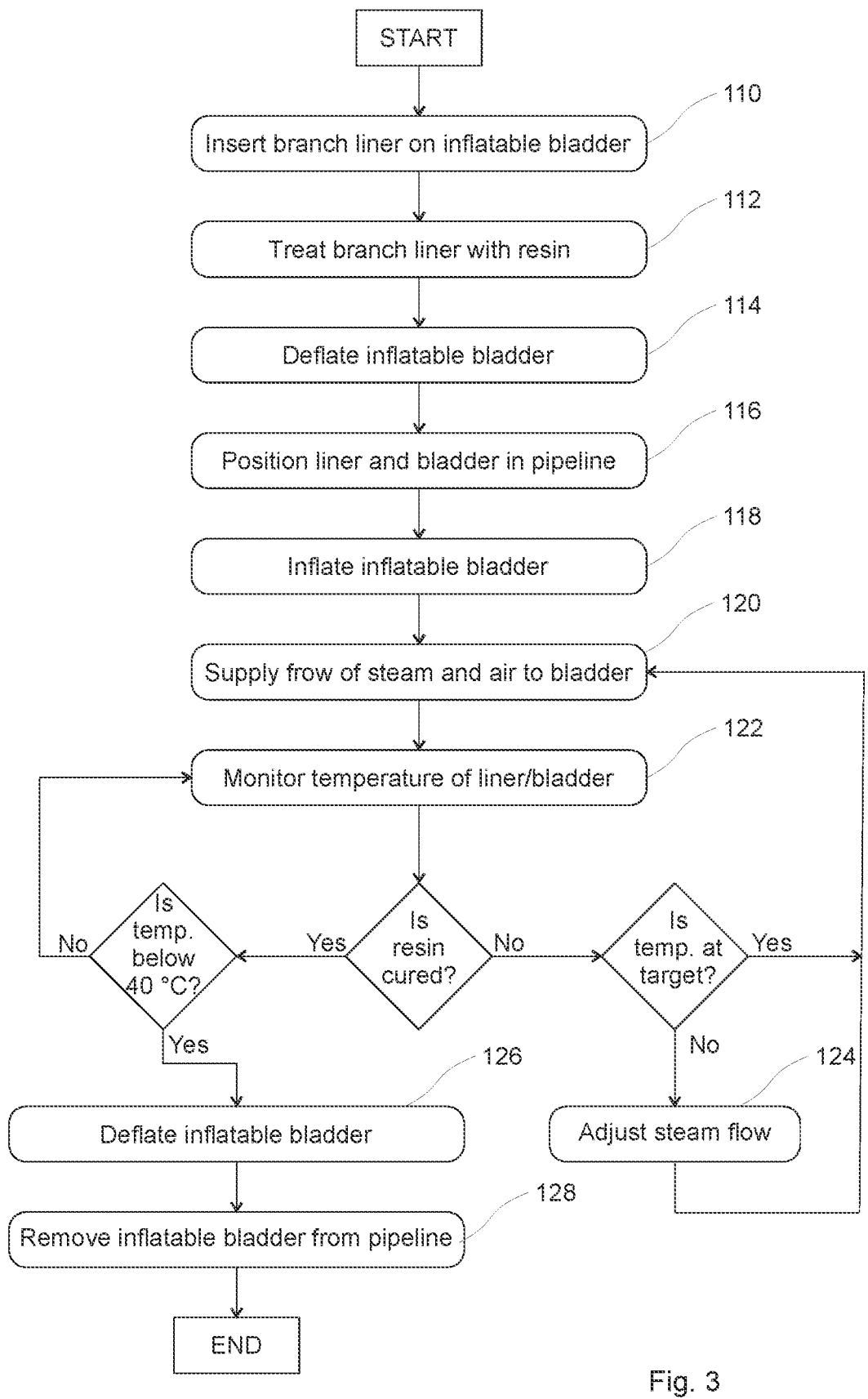
FIG. 3 is a flowchart of an embodiment of a method.

A flowchart of an embodiment of a method of lining a branch area in a pipeline 60 using an inflatable bladder 70 is shown in FIG. 3. The method comprises several steps:

A step 110 of inserting a branch liner 80 on the inflatable bladder 70. The branch liner 80 has a similar shape as the branch area that is to be lined within the pipeline. Similarly, the inflatable bladder 70 has a similar shape as the branch liner and as the branch area that is to be lined within the pipeline. The branch liner is pulled on the inflatable bladder so that the branch liner surrounds the inflatable bladder except at distal ends of the inflatable bladder which protrude from open ends of the branch liner. The inflatable bladder is preferably attached to two sleeves 41, 42, one sleeve at each distal end of a main line part of the inflatable bladder while the distal end of a branch line part is without a sleeve. A flexible tube or rod 45 runs inside the inflatable bladder between the two sleeves 41, 42.

A step 112 of treating the branch liner with a heat-curable resin. Typically, the resin is a two-component epoxy resin which is thoroughly mixed before applying it to the liner. The resin is heat-curable which means that curing of the resin either begins or significantly accelerates when the resin reaches a certain temperature, typically about 60° C. Use of a heat-curable resin allows for longer installation times than normal resin which begin to cure immediately.

A step 114 of deflating the inflatable bladder is done to be able to fit the inflatable bladder and the branch liner in to a pipeline. The deflating is done by sucking air out of the inflatable bladder. Preferably, the parts that are about to enter a branch of the pipeline are pushed inside the inflatable bladder to ensure proper opening of the inflatable bladder at its desired location in the pipeline.

A step 116 of positioning the inflatable bladder and the branch liner into a branch area of a pipeline. Using a flexible but firm tube or pushing rods 40, the inflatable bladder, and the resin-treated branch liner with it, is pushed into the pipeline 60. While monitoring, during the pushing, the position of the inflatable bladder with e.g. a video camera, the inflatable bladder is positioned into the branch area of the pipeline which is to be lined.

A step 118 of inflating the inflatable bladder 70 takes place once the inflatable bladder and the branch liner 80 are in a correct position in the branch area of the pipeline. The inflation is done by supplying air from a compressor 20 through a pressure regulator 33 to inside of the inflatable bladder to increase its internal pressure. The inflation pushes the resin-treated branch liner against internal walls of the branch area of the pipeline. This internal pressure must not be released before the resin is properly cured. Otherwise, the branch liner may collapse due to lack of support and then cure in a collapsed shape. Preferably, the pressure inside the inflatable bladder is regulated using a one-way pressure relief valve 43 which allows air to flow out from the inflatable bladder into the pipeline when there is excess pressure inside the inflatable bladder. The one-way pressure relief valve 43 prevents air from flowing into the inflatable bladder even in the case where pressure inside the inflatable bladder is lower than the pressure in the surrounding pipeline. Thus, the one-way pressure relief valve also allows for complete deflation of the inflatable bladder when needed for removal of the inflatable bladder from the pipeline.

A step 120 of running a flow of compressed air and steam through the inflatable bladder begins when it's safe to begin the curing process. That is, when the inflatable bladder has been inflated and the branch liner is in correct position in the branch area of the pipeline. During the curing process, a temperature of at least 50° C. is maintained in the inflatable bladder or the branch liner until the heat-curable resin has cured. As there are various different resins, the temperature could be higher or lower, depending on the type of heat-curable resin used for treating the branch liner. For some resins, the temperature can be for example 50° C., 60° C., 70° C. or 80° C. A temperature sensor 50 can be used on internal surface or external surface of the inflatable bladder to monitor 122 the temperature of the inflatable bladder or the branch liner. Alternatively, the temperature sensor can also be attached to or integrated into the branch liner itself. The closer the sensor is to the branch liner, the better it is for giving a reliable information about temperature of the branch liner. The temperature sensor is preferably a wired sensor and the wires are connected to a control unit or another device that controls the supply of steam and/or air into the inflatable bladder. Of course, also wireless sensors can be used instead if desired. It is important to have a temperature sensor 50 at the branch area to get proper measurements of the temperature. If the temperature of the air and steam is only measured before the air and steam enter the pipeline, the actual temperature of the branch liner remains unknown. A significant temperature drop occurs between a steam generator 10 and the branch liner 80 but the magnitude of the temperature drop remains unknown if the temperature is not measured at the branch area.

In a preferred embodiment, a mixture of steam and compressed air is supplied continuously during the curing process. The temperature of the supplied mixture is controlled based on the temperature of the inflatable bladder or the branch liner. This is preferably done by adjusting 124 the amount of steam in the mixture of steam and compressed air based on the temperature of the inflatable bladder or the branch liner. For example, by using a steam generator and a solenoid valve 32 or a magnetic valve for releasing the generated steam into a flow of compressed air, the solenoid valve can be controlled with a signal of a temperature sensor 50 measuring the temperature of the inflatable bladder or the branch liner. The adjusting of temperature can be further enhanced by measuring temperature of the mixture before it enters the inflatable bladder, for example with a temperature sensor 36 placed on the supply hose 31 soon after mixing the compressed air and the steam.

A step 122 of monitoring the temperature of the inflatable bladder or the branch liner continues after supply of steam is stopped. The temperature is monitored at least until the temperature falls for example below 40° C., below 35° C. or below 30° C. to make sure that the branch liner has cooled off enough to be able to support itself without collapsing. This cooling period varies significantly depending on prevailing conditions at the branch area where the branch liner was installed. For example, a plastic pipe installed outdoors in a cold climate will cool off quickly whereas a cast iron pipe in an insulated space will store the heat of the steam and cooling off will take much longer. It is crucial to keep the inflatable bladder inflated and wait until the temperature is low enough to prevent the collapse of the branch liner. Preferably a step of measuring air pressure in the inflatable bladder over time and a step of creating a log of the measured air pressures takes place while the inflatable bladder is in its inflated state, i.e. during curing of the resin and during cooling. Monitoring and logging of the pressure can help to detect possible problems in the process and prevent further damage, such as a collapse of the branch liner.

A step 126 of deflating the inflatable bladder is a prerequisite for removing the bladder from the pipeline. Use of the one-way pressure relief valve 43 in the inflatable bladder makes it possible to suck essentially all the air out from inside the inflatable bladder to minimize its size. The one-way pressure relief valve prevents flow of air back into the inflatable bladder while allowing a flow through the inflatable bladder. A small opening would also allow the flow through the inflatable bladder but prevent a proper deflation of the inflatable bladder.

A step 128 of removing the inflatable bladder from the pipeline finishes the installation.

An exemplary system to implement the described method is shown in FIG. 1 and details of an example of a control unit 30 are shown in FIG. 2. The system comprises a steam generator 10 connected with a steam hose 11 to a control unit 30. A compressor 20 is connected with an air hose 21 to control unit 30. The control unit 30 can include more or less components than what is shown in this example. All the components shown in FIG. 2 within the control unit could also be separate devices instead of being packaged into a single control unit. Also, some of the devices of FIG. 1 could be included in the control unit 30. For example, the control unit 30 could include the compressor or the steam generator 10—or both.

Now looking at the control unit in FIG. 2, the steam hose 11 is connected to a solenoid valve 32 or magnetic valve which can be controlled with an electric control signal. This control signal is generated based on one or more temperature sensors 36, 50. A target temperature is defined and signal(s) from the temperature sensor(s) is compared to the target temperature. If a measured temperature is too low, the solenoid valve is opened and more steam will flow. If the measured temperature is too high, the solenoid valve is closed and less or no steam will flow.

The air hose 21 is connected to a pressure regulator which regulates air pressure of an output of the compressor. The pressure regulator should be adjusted to output a pressure level that is lower than a rated maximum pressure of the inflatable bladder. The steam flow from the solenoid valve 32 and the air flow from the pressure regulator are combined with a hose connector 34. The mixture of steam and compressed air will flow in a supply hose 31 into the inflatable bladder. The control unit preferably includes a pressure sensor 35 to indicate the pressure within the supply hose and the inflatable bladder. Also, the control unit can include a temperature sensor 36 for measuring output temperature of the mixture of steam and compressed air.

The supply hose 31 is in fluid connection with the inside of the inflatable bladder 70. The inflatable bladder has a main line part and a branch line part which protrudes in an angle from the main line part. The branch line part often has a smaller diameter than the main line part. In each end of the main line part is a sleeve 41, 42 through which the mixture of steam and compressed air can flow. The supply hose 31 and a pushing rod or tube 40 are connected to the sleeve 41 that is closer to a user the system. The supply hose can be outside or inside the pushing rod/tube 40. A tube or rod 50 extends between the sleeves, inside the inflatable bladder to prevent longitudinal elongation or contraction of the inflatable bladder. The sleeve 42 further from the user of the system preferably comprises a one-way pressure relief valve 43 which allows for the steam and the compressed air to flow out from the inflatable bladder when pressure inside the inflatable bladder is high enough. The one-way pressure relief valve should be adjusted to a pressure level that is higher than atmospheric pressure but lower than the pressure at the output of the pressure regulator 33. Thus, a continuous flow of steam and compressed air through the inflatable bladder and ultimately conveying of heat to the branch liner 80 can be arranged.

It is apparent to a person skilled in the art that the above exemplary embodiments are rather simple in structure and operation for the purposes of illustration. By following the model shown in this patent application, it is possible to construct different and even very complex solutions that utilize the inventive idea disclosed in this patent application.

The invention claimed is:

1. A method of lining a branch area in a pipeline using an inflatable bladder, wherein the method comprises the steps of:
    inserting a branch liner on the inflatable bladder,
    treating the branch liner with a heat-curable resin,
    deflating the inflatable bladder,
    positioning the inflatable bladder and the branch liner into the branch area of a pipeline,
    inflating the inflatable bladder,
    running a flow of compressed air and steam through the inflatable bladder while maintaining temperature of at least 50° C. of the inflatable bladder or the branch liner until the heat-curable resin has cured,
    monitoring the temperature of the inflatable bladder or the branch liner at least until the temperature falls below 40° C.,
    deflating the inflatable bladder, and
    removing the inflatable bladder from the pipeline.

2. A method according to claim 1, wherein the step of running a flow of compressed air and steam comprises continuously supplying a mixture of steam and compressed air, where the temperature of the supplied mixture is controlled based on the temperature of the inflatable bladder or the branch liner.

3. A method according to claim 2, wherein the method comprises controlling the amount of steam in the mixture of steam and compressed air based on the temperature of the inflatable bladder or the branch liner.

4. A method according to claim 1, wherein the method further comprises a step of regulating pressure inside the inflatable bladder using a one-way pressure relief valve.

5. A method according to claim 1, wherein the method further comprises a step of measuring a temperature of the mixture of steam and compressed air before it enters the inflatable bladder.

6. A method according to claim 1, wherein the method further comprises a step of measuring air pressure in the inflatable bladder over time and a step of creating a log of the measured air pressures.

7. A method according to claim 1, wherein the branch liner comprises a temperature sensor.

8. A method according to claim 1, wherein the inflatable bladder comprises a temperature sensor.

9. A method according to claim 1, wherein the step of positioning the inflatable bladder and the branch liner includes positioning of a temperature sensor into the branch area of the pipeline.

* * * * *